United States Patent [19]
Byron

[11] Patent Number: 5,920,582
[45] Date of Patent: Jul. 6, 1999

[54] CLADDING MODE PUMPED AMPLIFIER

[75] Inventor: Kevin Christopher Byron, Herts, United Kingdom

[73] Assignee: Northern Telecom Limited, Montreal, Canada

[21] Appl. No.: 08/770,222

[22] Filed: Dec. 19, 1996

[51] Int. Cl.⁶ ........................................................ H01S 3/30
[52] U.S. Cl. ............................................... 372/6; 372/102
[58] Field of Search ........................ 372/6, 102; 359/341

[56] References Cited

U.S. PATENT DOCUMENTS

| | | |
|---|---|---|
| 4,815,079 | 3/1989 | Snitzer . |
| 4,860,295 | 8/1989 | Byer . |
| 4,913,521 | 4/1990 | Tajima . |
| 5,187,760 | 2/1993 | Huber .......................................... 372/6 |
| 5,291,501 | 3/1994 | Hanna .......................................... 372/6 |
| 5,473,622 | 12/1995 | Grubb . |
| 5,600,665 | 2/1997 | Minden et al. ............................... 372/6 |
| 5,642,453 | 6/1997 | Margulis et al. ............................ 372/6 |
| 5,724,164 | 3/1998 | Lowenhar et al. .......................... 372/6 |

FOREIGN PATENT DOCUMENTS

| | | |
|---|---|---|
| 0720261 | 7/1996 | European Pat. Off. . |
| 95110868 | 4/1995 | WIPO . |

OTHER PUBLICATIONS

K.O. Hill et al, Electronics Letters, Aug. 2, 1990, vol. 26, No. 16.
A.M. Vengsarkar et al; JLT, vol. 14, No. 1, Jan 1 1996.
G. Meltz et al, Optics Letters; Aug. 1, 1989; vol. 14, No. 15.

*Primary Examiner*—Rodney Bovernick
*Assistant Examiner*—Robert E. Wise
*Attorney, Agent, or Firm*—John D. Crane

[57] ABSTRACT

An active optical fiber for use in an amplifier or laser has an inner cladding and an outer cladding. An index grating is written into the inner cladding to provide coupling between cladding modes of pumping radiation conducted in the inner cladding. The periodicity of the index grating is selected to couple energy from cladding modes having minimal overlap with the core to cladding modes having relatively high overlap. The efficiency of pumping the radiation amplifying medium of the core is thereby improved. The fibre has utility in transmitters for broad band networks.

15 Claims, 2 Drawing Sheets

CLADDING MODE PUMPED AMPLIFIER

BACKGROUND OF THE INVENTION

This invention relates to cladding mode pumped amplifiers and to an optical waveguide for use in such amplifiers. It is known to provide optical waveguides such as optical fibres in which a core is suitably doped, for example using rare earth ions, such that the core constitutes a light amplifying medium capable of providing light amplification by stimulated emission of radiation. Such fibres may therefore be used to provide light amplification by transmission through the fibre or used in conjunction with a resonant cavity to provide a laser. The present invention is concerned primarily with light amplification as in the case of signals transmitted down optical fibres.

In order to effect optical pumping in the light amplifying medium, it is necessary to provide pumping light at an appropriate wavelength to excite the amplifying medium. Although pumping light in a conventional amplifier is injected longitudinally into the core together with the optical signal there are practical limitations on the amount of power which can be launched into a single mode core. It has therefore been proposed to inject pumping light to propagate longitudinally in the cladding surrounding the core, such propagation requiring the fibre to be a double clad fibre having an inner cladding surrounding the core and an outer cladding surrounding the inner cladding such that the inner cladding acts as a wave guide providing multi-mode conduction of the pumping light. In such an arrangement, optical pumping occurs due to the overlap of the electric field intensity of pumping light with the core.

A problem with such cladding mode optical pumping is that some of the modes in the pumping light have only minimal overlap with the core and therefore provide virtually no contribution to optical pumping. It has been proposed in U.S. Pat. No. 4,815,079 to improve the efficiency of cladding mode optical pumping by placing the core at an off-centre position within the inner cladding and to further improve pumping efficiency by perturbing the modes in the inner cladding by introducing slight bends in the fibre. The perturbation introduced by the bends causes radiation from cladding modes which would not ordinarily pass through the core to couple into other cladding modes which pass through the position occupied by the core.

A disadvantage of bending the fibre in this manner is that the inter-modal coupling is indiscriminate and uncontrolled. In some applications, it may not be practicable to allow the fibre to be bent. The off-set core configuration may also present difficulties when coupling the conventional fibres having coaxial symmetry.

It is also known from U.S. Pat. No. 5,473,622 to provide a cladding pumped laser in which the inner cladding has a rectangular cross section and a resonance cavity is formed in the core by writing one or more spaced pairs of index gratings, each pair defining an oscillator. The index gratings are written in the core by doping the core with refractive index modifying dopants and transversely illuminating the fibre with a focused ultra-violet beam creating an interference pattern at the core. Index changes occur in the core with a predetermined spatial periodicity where the UV light bands appear, thereby forming a Bragg reflector at the wavelength of the optical signal conducted through the core. Index gratings formed in the core of optical fibres are also known for other purposes such as wavelength selective couplers and taps and dispersion compensated filters.

It is also known from K. O. Hill et al,.Electronics Letters, Aug. 2, 1990, Vol. 26, No. 16, to write long period gratings in the core of a multi-mode fibre with a single cladding in order to couple energy from one mode to another mode during longitudinal transmission through the core. A step by step index grating writing method is disclosed in which individual index perturbations are created with any desired spatial frequency.

SUMMARY OF THE INVENTION

The present invention is directed to an optical waveguide and a light amplifier comprising such a waveguide in which inter-modal coupling of the pumping light is effected in a controlled manner and which improves the efficiency with which the pumping light effects optical pumping of the light amplifying medium.

According to the present invention there is disclosed an optical waveguide comprising a core constituted by a light amplifying medium;

an inner cladding surrounding the core;

an outer cladding surrounding the inner cladding; and at least one index grating formed in the inner cladding.

Preferably the at least one index grating is constituted by perturbations in refractive index in the inner cladding having a periodicity along the length of the waveguide selected to provide coupling in use between modes of pumping radiation conducted through the inner cladding such that pumping radiation energy is coupled into modes having relatively high overlap of electric field intensity with the core.

An advantage of such an index grating is to enable the energy contained in the low overlap modes to be utilised in optical pumping, thereby improving the pumping efficiency of the waveguide.

Advantageously, the periodicity of the perturbations is non-uniform along the length of the grating to define a plurality of periodicities defining respective phase matching conditions for a corresponding plurality of inter-modal couplings.

This provides the advantage of enabling a plurality of low overlap cladding modes to be addressed in the process of coupling energy to high overlap cladding modes.

Advantageously, the inner cladding is doped with a photosensitive refractive index modifying dopant.

This facilitates the writing of the index grating by means of irradiation with light having an appropriate wavelength for the photosensitivity of the dopant.

In a preferred embodiment, the dopant is Germanium.

According to a further aspect of the present invention there is disclosed an amplifier comprising a double clad optical waveguide, the waveguide comprising a core for conducting an optical signal and constituted by a radiation amplifying medium;

an inner cladding surrounding the core and operable to provide multi-modal conduction of pumping radiation for optically pumping the radiation amplifying medium such that, in use, energy of the pumping radiation is transmitted in multiple cladding modes;

an outer cladding surrounding the inner cladding; and an index grating formed in the inner cladding and operable to couple energy from a first cladding mode of the pumping radiation having a relatively low overlap of electric field intensity with the core to a second cladding mode of pumping radiation having a relatively high overlap with the core.

Such an amplifier has the advantage of improved pumping efficiency by virtue of the above described waveguide.

According to a further aspect of the present invention there is disclosed a method of amplifying an optical signal comprising the steps of providing an optical waveguide having a core constituted by a radiation amplifying medium, an inner cladding surrounding the core and an outer cladding surrounding the inner cladding;

injecting the optical signal from a signal source into the core for signal mode transmission therein;

injecting pumping radiation into the inner cladding for longitudinal transmission therein, the pumping radiation being propagated as a multiplicity of cladding modes;

optically pumping the radiation amplifying medium by means of the pumping radiation containing at least some cladding modes having an electric field intensity overlapping with the core;

amplifying the optical signal by stimulated emission of radiation in the radiation amplifying medium;

and coupling energy from at least a first cladding mode of the pumping radiation having a relatively low overlap of electric field intensity with the core to a second cladding mode of pumping radiation having a relatively high overlap with the core by means of an index grating written in the inner cladding and defining a periodicity of index perturbations corresponding to a phase matching condition between the first and second cladding modes.

BRIEF DESCRIPTION OF THE DRAWINGS

There now follows a description of a preferred embodiment of the present invention by way of example only and with reference to the accompanying drawings of which.

DETAILED DESCRIPTION OF PREFERRED EMBODIMENTS

Figure 1:
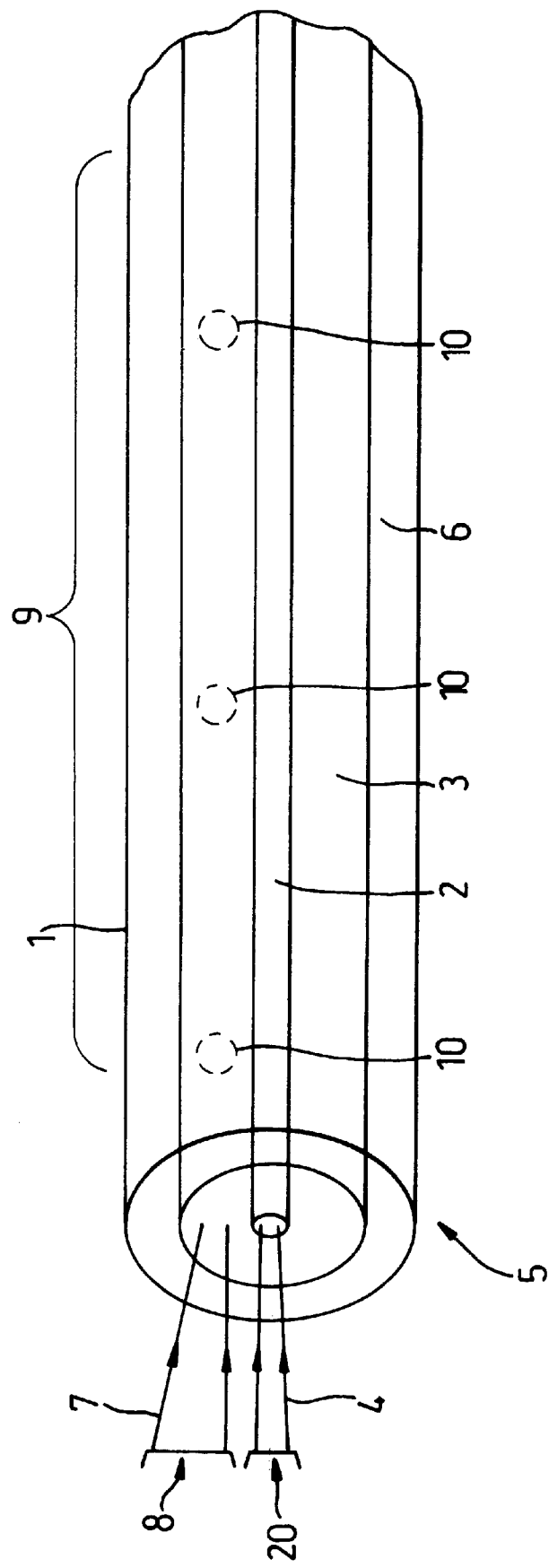
FIG. 1 is a schematic sectioned elevation of an optical fibre having an inner and outer cladding in accordance with the present invention.

FIG. 1 shows schematically an optical waveguide constituted by a fibre 1 having a silicate glass core 2 doped with Erbium ions to thereby constitute a light amplifying medium. The core 2 is surrounding symmetrically by a coaxial cylindrical inner cladding 3 having a lower refractive index than the core and co-operating with the core to support core propagation of an optical signal 4 injected from a signal source 20 at a free end 5 of the fibre. The diameter of the core is selected to provide single mode propagation of the optical signal 4 and will typically be of the order of 2 microns.

An outer cladding 6 surrounds the inner cladding 3 and is formed cylindrically and coaxial with the core 2. The outer cladding 6 has a lower refractive index than the inner cladding 3 and co-operates with the inner cladding to support propagation of pumping radiation 7 injected longitudinally into the inner cladding 3 at the free end 5 from a pumping source 8. The diameter of the inner cladding 3 is selected to provide multi-mode propagation of the pumping radiation and will typically be of the order of 10 microns.

An index grating 9 is formed in the inner cladding 3 by a series of index perturbations 10 constituted by localised regions of increased refractive index which are spaced longitudinally along the fibre 1 with periodicity Λ. The index grating 9 is a long period index grating, typically having a periodicity in the range 10 to 1000 microns, the periodicity being accurately predetermined as described below. FIG. 1 is schematic in that the index grating 9 is shown adjacent the free end 5 whereas in practice this need not generally be the case. The longitudinal extent of the index grating 9 will typically extend over a major portion of the active fibre 1 and may extend over its entire length if required.

Pumping radiation 7 conducted through the inner cladding 3 will contain a number of modes which provide a satisfactory degree of overlap of electric field intensity with the core 2, thereby providing efficient transfer of pumping energy to the light amplifying medium. Some modes however which are supported by the inner cladding 3 will have minimal overlap with the core 2. The periodicity Λ is selected to provide coupling of energy from a first LP mode having minimal overlap to a second LP mode having a satisfactory degree of overlap, the periodicity being determined by the phase matching condition expressed in equation 1;

Equation 1:- $$\Lambda = \frac{2\pi}{\beta_1 - \beta_2}$$

Where $\beta_1$ and $\beta_2$ are the respective propagation constants of the first and second LP modes; each of the LP modes may be degenerate and constituted by a plurality of "exact" modes.

The second mode for example may be $LP_{01}$, or any of the $LP_{0m}$ modes.

The effect of the inter-modal coupling provided by the index grating 9 is to couple energy between the first mode and the second mode such that the total energy is shared to enable a greater proportion of the total energy to be utilised in optical pumping by virtue of the second mode overlapping significantly with the core 2.

In the preferred embodiment, the periodicity Λ is varied step-wise along the length of the index grating 9 in order to satisfy at each of a plurality of portions of the grating a different corresponding phase matching condition appropriate to corresponding inter-modal couplings. In this way, energy contained in LP modes of relatively low overlap with the core 2 can be utilised by coupling to modes with an enhanced degree of overlap, thereby improving the overall pumping efficiency achievable for a given power input of pumping light. Since in practice the power input of pumping light will be limited, primarily by the available power output of the pumping light source 8, the efficiency with which optical pumping is achieved in the amplifying medium can be significantly improved relative to known techniques.

Figure 2:
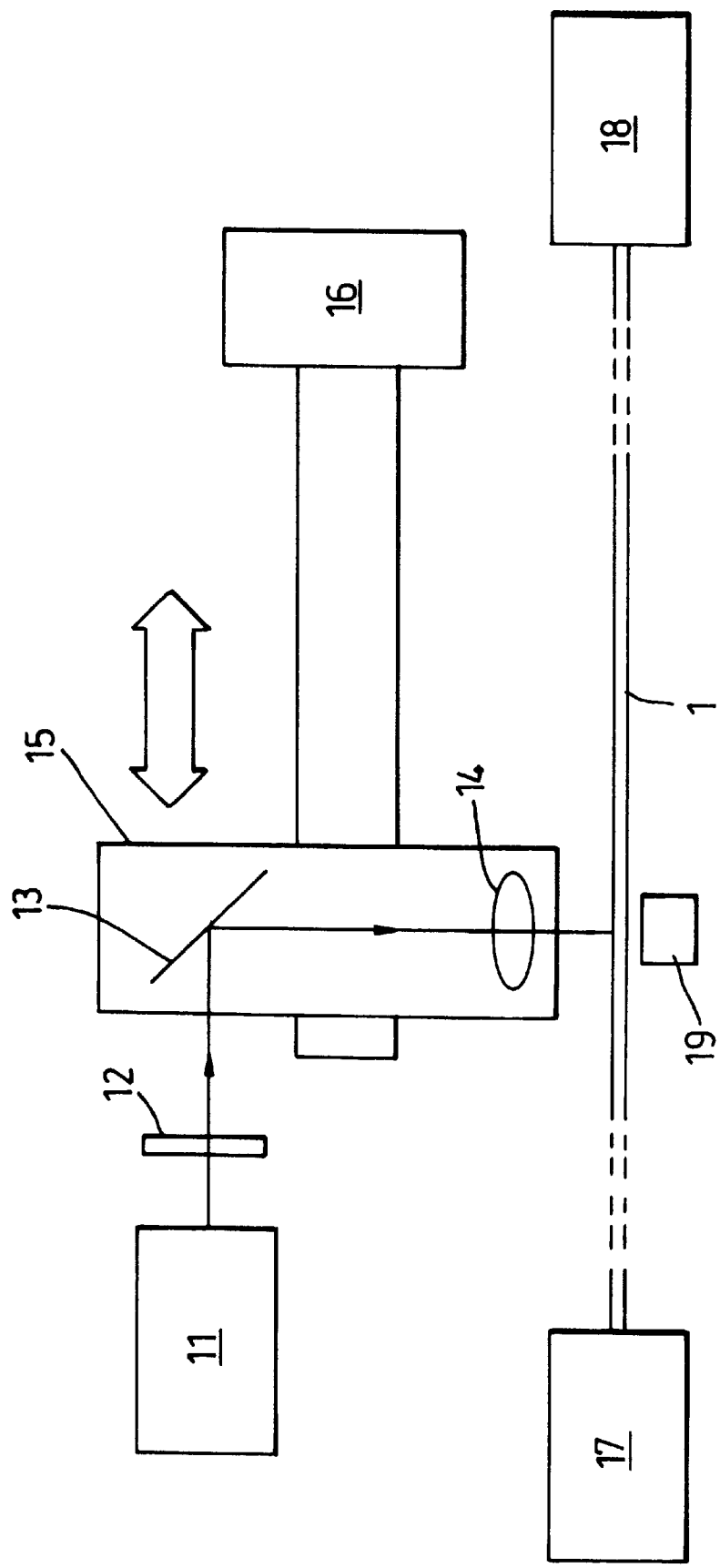
FIG. 2 is a schematic plan view of apparatus used in the writing of an index grating in the inner cladding of the optical fibre of FIG. 1.

The manner in which the index grating 9 is written into the inner cladding 3 will now be described with reference to FIG. 2 using corresponding reference numerals to those of FIG. 1 where appropriate. FIG. 2 shows in plan view the fibre 1 constrained to extend linearly and horizontally during a writing process in which ultra-violet light from a UV source 11 is focused to irradiate localised portions of the inner cladding 3 at locations corresponding to index perturbations 10 in FIG. 1. The perturbations 10, seen in side elevation in FIG. 1, are located in spaced relationship above the core 2 by a distance of approximately twice the core diameter. Each irradiation step creates an index perturbation 10 as a result of photosensitivity of a refractive index modifying dopant contained in the inner cladding 3, this dopant in the preferred embodiment being Germanium so that localised regions of Germanium Dioxide create index perturbations 10 in which the refractive index is increased relative to the surrounding material of the inner cladding 3. The inner cladding 3 is pre-sensitised by impregnating the fibre 1 with Hydrogen, completion of the writing of the grating being following by an annealing process in which Hydrogen is purged from the fibre 1.

A shutter 1 2 is used to control the duration of exposure of the fibre 1 to form each index perturbation 10, the UV light being projected into the fibre 1 via a mirror 13 and a lens 14, both of which are mounted on a linear transport platform 15 movable in step-wise fashion in a direction parallel to the fibre 1 under the control of a controller 16. The controller 16 will therefore be programmed to transport the platform 15 by a distance corresponding to the periodicity Λ between successive irradiation steps, the periodicity Λ being varied if so required under the control of the controller 16 to produce a chirped grating defining a plurality of inter-modal coupling phase relationships as described above.

Optionally, the fibre 1 may receive an injected optical signal and pumping light from a test transmitter 17 during the step by step writing process, the output of the fibre being analysed in a test analyser 18 in which the amplified optical signal is measured to determined the gain of the amplification stage constituted by the fibre 1. In this way the efficiency achieved by the index grating 9 may be monitored during the writing process and the length of the index grating, or of each portion of the grating of a specific periodicity, determined accordingly.

Initial alignment of the mirror 13 and lens 14 is effected by means of a detector 19 enabling the irradiation of the fibre 1 to be imaged. The platform 15 is adjustable in a vertical direction, i.e. at right angles to the mutual plane of the fibre 1 and the irradiating UV light, an initial alignment step being carried out to determine a height of the platform 15 at which the UV light is incident centrally on the core 2. This can be determined by observing the image transmitted through the fibre 1 and detected by the detector 19, central alignment being achieved when a symmetrical diffraction pattern about the core 2 is detected. The diffraction pattern is created by virtue of transmission around the core, the core 2 having a relatively high opacity to UV light. Having determined the alignment with the core 2, the platform 15 is then raised by a distance corresponding to the desired radial off-set from the core axis, the off-set typically being approximately twice the core diameter.

During subsequent linear movement of the platform 15, this vertical alignment relative to the core axis is maintained. The resulting index grating 9 therefore consists of a series of index perturbations 10 which are localised along the upper side of the outer cladding 6.

Optionally, the writing process may include the additional step of irradiating the core 2 along its entire length in a uniform manner so as to saturate the photosensitivity of the core. Subsequent writing of the index grating in the inner cladding 3 will then have no perturbing effect on the index of the core 2 due to stray radiation.

Photosensitivity may be provided by any suitable dopant known to provide this effect, such as oxides of Germanium and oxides of Germanium in combination with Boron, Tin or Phosphorous. The writing process for such dopants requires illumination with ultra-violet light of wavelength in the range 190 to 260 Nm. Suitable ultra-violet sources 11 for this purpose include doubled argon lasers, eximer lasers and quadroupled neodymium: YAG lasers. Undoped fibres may also exhibit sufficient photosensitivity to facilitate the writing process.

The controller 16 will typically be a micro-controller driving a stepper motor.

The above described writing process results in index perturbations 10 being created along one side of the inner cladding 3. In an alternative arrangement, perturbations are created simultaneously on opposite sides of the inner cladding 3 by optically dividing the ultra-violet radiation. Interference or holographic processes may be used as alternative techniques of controlling the position of localised irradiation during the writing process.

An amplifier in accordance with the present invention would comprise the fibre 1 of FIG. 1 in combination with the pumping source 8 and signal source 20. Such an amplifier is suitable for use as a transmitter in a broad band network operating at 10 Gbits having multiple wavelength propagation through a single mode fibre. The fibre in such an amplifier could be linearly deployed or wound onto a reel. If it is intended to use the fibre on a reel, the periodicity of the index grating 9 would need to be compensated for the effect of winding the fibre onto the reel.

The core 2 may be doped with alternative materials to Erbium, such as other rare earth ions including Neodymium and Ytterbium.

The step of pre-sensitising the fibre by Hydrogen impregnation prior to the step of writing the index grating may be omitted provided that sufficient photosensitivity is exhibited by the fibre. Since photosensitivity tends to increase with decreasing wavelength, the need for Hydrogen impregnation is more important when writing the grating using light of relatively long wavelengths.

The present invention has application also to waveguides other than optical fibres, such as for example an amplifying planar waveguide.

I claim:

1. An optical waveguide comprising a core constituted by a radiation amplifying medium;

an inner cladding surrounding the core;

an outer cladding surrounding the inner cladding; and at least one index grating formed in the inner cladding.

2. An optical waveguide as claimed in claim 1 wherein the at least one index grating is constituted by perturbations in refractive index in the inner cladding having a periodicity along the length of the waveguide selected to providing coupling in use between modes of pumping radiation conducted through the inner cladding such that pumping radiation energy is coupled into modes having overlap of electric field intensity with the core.

3. An optical waveguide as claimed in claim 2 wherein the periodicity of the perturbations is non-uniform along the length of the grating to define a plurality of periodicities defining respective phase matching conditions for a corresponding plurality of inter-modal couplings.

4. An optical waveguide as claimed in claim 1 wherein the inner cladding is doped with a photosensitive refractive index modifying dopant.

5. An optical waveguide as claimed in claim 4 wherein the photosensitive refractive index modifying dopant is Germanium.

6. An optical waveguide as claimed in claim 1 wherein the radiation amplifying medium comprises Erbium ions.

7. An optical waveguide as claimed in claim 1 wherein the periodicity is in the range 10 to 1000 microns.

8. An optical waveguide as claimed in claim 1 wherein the optical waveguide comprises an optical fibre.

9. An amplifier comprising a double clad optical waveguide, the waveguide comprising a core for conducting an optical signal and constituted by a radiation amplifying medium;

an inner cladding surrounding the core and operable to provide multi-modal conduction of pumping radiation for optically pumping the radiation amplifying medium such that, in use, energy of the pumping radiation is transmitted in multiple cladding modes;

an outer cladding surrounding the inner cladding; and an index grating formed in the inner cladding and operable to couple energy from a first cladding mode of the pumping radiation having an overlap of electric field intensity with the core to a second cladding mode of pumping radiation having a higher overlap with the core than said first mode.

10. An amplifier as claimed in claim 9 wherein the index grating is chirped to provide a plurality of periodicities of index perturbations constituting the index grating, the plurality of periodicities defining respective phase matching conditions for a corresponding plurality of inter-modal couplings from cladding modes of the pumping light having overlap with the core to cladding modes of the pumping light having a higher overlap with the core.

11. An amplifier as claimed in claim 9 comprising a pumping source operable to input pumping radiation to the inner cladding at a free end of the fibre and a signal source for inputting an optical signal to the core at the free end of the optical waveguide whereby the amplifier constitutes a transmitter.

12. An amplifier as claimed in claim 9 wherein the optical waveguide comprises an optical fibre.

13. A method amplifying an optical signal comprising the steps of providing an optical waveguide having a core constituted by a radiation amplifying medium, an inner cladding surrounding the core and an outer cladding surrounding the inner cladding;

injecting the optical signal from a signal source into the core for signal mode transmission therein;

injecting pumping radiation into the inner cladding for longitudinal transmission therein, the pumping radiation being propagated as a multiplicity of cladding modes;

optically pumping the radiation amplifying medium by means of the pumping radiation containing at least some cladding modes having an electric field intensity overlapping with the core;

amplifying the optical signal by stimulated emission of radiation in the radiation amplifying medium;

and coupling energy from at least a first cladding mode of the pumping radiation having an overlap of electric field intensity with the core to a second cladding mode of pumping radiation having a higher overlap with the core by means of an index grating written in the inner cladding and defining a periodicity of index perturbations corresponding to a phase matching condition between the first and second cladding modes.

14. A method of amplifying an optical signal as claimed in claim 13 wherein the index grating is chirped to define a plurality of periodicities, and including the step of coupling energy from a plurality of cladding modes having overlap with the core to a corresponding plurality of cladding modes having a higher overlap with the core.

15. A method as claimed in claim 13 wherein the optical waveguide comprises an optical fibre.

* * * * *